(12) United States Patent
Johnson et al.

(10) Patent No.: US 8,398,037 B2
(45) Date of Patent: Mar. 19, 2013

(54) EQUIPMENT SUPPORT

(76) Inventors: Joseph M. Johnson, San Luis Obispo, CA (US); Matthew L. Burk, San Luis Obispo, CA (US)

(*) Notice: Subject to any disclaimer, the term of this patent is extended or adjusted under 35 U.S.C. 154(b) by 85 days.

(21) Appl. No.: 13/032,149

(22) Filed: Feb. 22, 2011

(65) Prior Publication Data
US 2011/0260016 A1    Oct. 27, 2011

Related U.S. Application Data

(60) Provisional application No. 61/343,114, filed on Apr. 23, 2010.

(51) Int. Cl.
*F16M 11/00* (2006.01)

(52) U.S. Cl. ............ 248/163.2; 248/168; 248/177.1

(58) Field of Classification Search .......... 248/168, 248/163.1, 163.2, 166, 167, 177.1, 176.3, 248/188.8
See application file for complete search history.

(56) References Cited

U.S. PATENT DOCUMENTS

| | | | | |
|---|---|---|---|---|
| 911,508 | A * | 2/1909 | Look | 248/167 |
| 2004/0129843 | A1* | 7/2004 | Pernstich et al. | 248/163.1 |
| 2006/0175848 | A1* | 8/2006 | Akad | 293/133 |
| 2009/0250567 | A1* | 10/2009 | Raynaud | 248/168 |
| 2011/0031358 | A1* | 2/2011 | Fischer | 248/168 |

* cited by examiner

*Primary Examiner* — Ramon Ramirez
(74) *Attorney, Agent, or Firm* — Chernoff Vilhauer McClung & Stenzel, LLP

(57) ABSTRACT

A support having a plurality of elongate hollow leg members, each of which is at least partially supporting an apex selectively, detachably mountable to equipment. At least one leg member has a circumferential wall of a thickness along a major portion of its length no more than approximately 0.04 inches.

28 Claims, 16 Drawing Sheets

EQUIPMENT SUPPORT

CROSS-REFERENCE TO RELATED APPLICATIONS

This application claims the benefit of U.S. Prov. App. No. 61/343,114, filed Apr. 23, 2010.

BACKGROUND OF THE INVENTION

The present invention relates to a portable support apparatus for equipment, such as a tripod or monopod.

Equipment support apparatus has been used for many years. Typically, equipment support apparatus includes an elevated mounting surface, upon which equipment may be secured, such as a camera, telescope, musical equipment, surveying equipment, antenna, etc. The elevated mounting surface is supported by a plurality of legs, which in the case of a tripod is typically three. Other numbers of legs may likewise be used, such as a single leg monopod, two legs or four or more legs.

Equipment support apparatus, such as tripods, are designed to provide some optimal balance between a set of features. For example, one feature of a tripod is stability, as it is often desirable to insure that shaking or other movement of equipment supported by the tripod is minimized so that, for example, blur does not occur in an image taken by a camera supported on the tripod. Tripods are often used portably, hence, it is often desired to minimize the weight and/or dimensions of the tripod so that it may be carried over great distances. Unfortunately, these stability and weight considerations are often in conflict, i.e. a heavier tripod will provide a high degree of stability but will be more burdensome to carry.

Many existing tripods are both vertically collapsible with radially extendible legs. For example, a tripod may have three leg assemblies, with each leg assembly pivotally connected to an elevated equipment support so that each leg may be pivoted outwards when in use, and inwards when not in use. Also, each leg assembly may have multiple elements that selectively slide axially relative to each other. For example, a multi-stage tripod may have first, second, and third segments for each leg. To adjust the height of the tripod, the first and second leg segments are slidably movable relative to each other and the second and third leg segments are also slidably movable relative to each other. Each pair of legs may be selectively locked and unlocked at different positions. Tripods also may include an adjustable central column to change the height at which equipment is supported by the tripod at a fixed extension of the tripod legs.

A multi-stage tripod is relatively lightweight and stable, with the caveat that the tripod's height and/or footprint are sacrificed for stability rather than weight. For example, by fully pivoting the tripods legs outward, and/or only partially extending the column, the stability of the tripod is improved at the expense of height.

In view of the foregoing discussion, what is desired is an improved tripod portable support apparatus for equipment.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
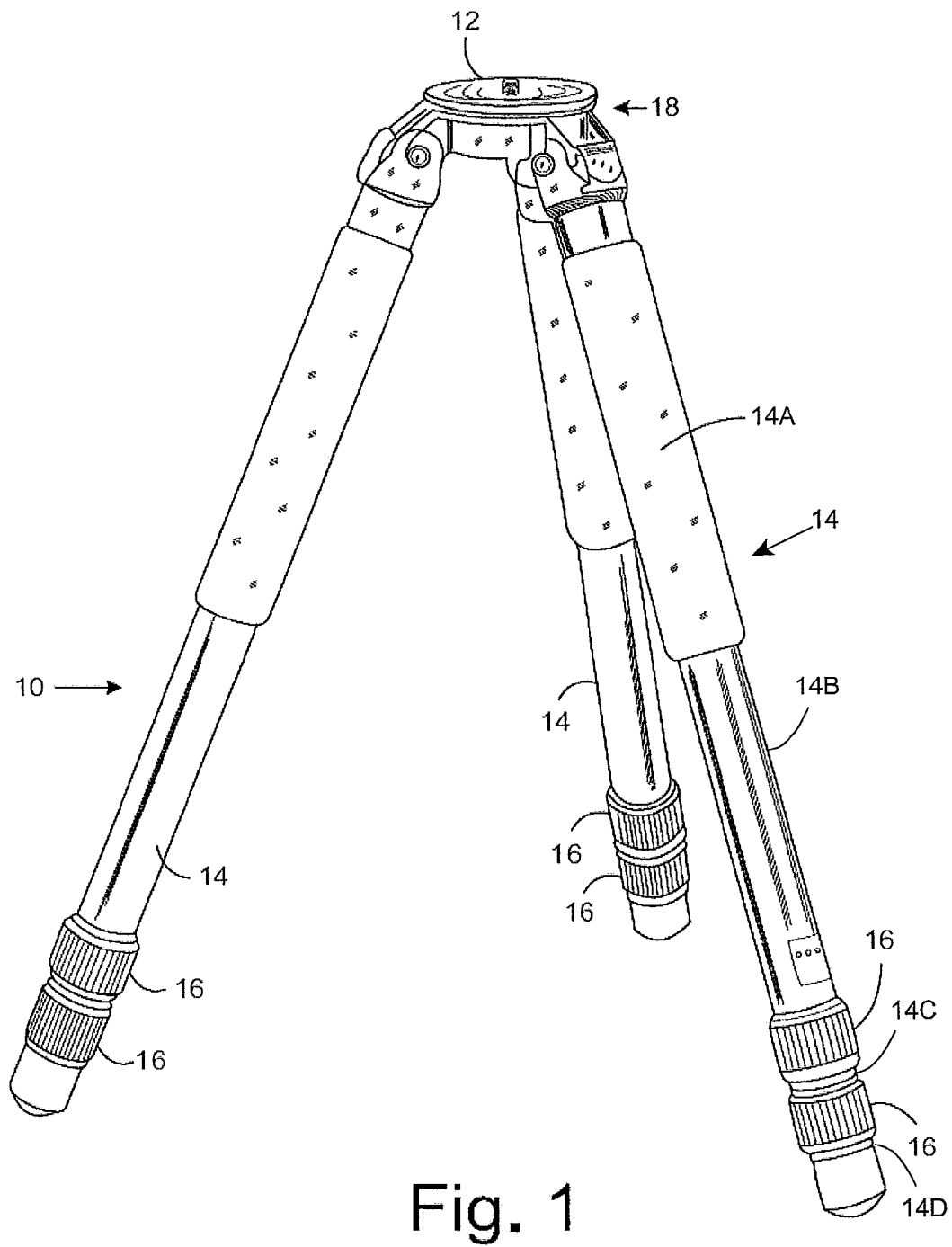
FIG. 1 shows a perspective view of a tripod that includes features disclosed in this specification.

FIG. 1 shows an exemplary tripod 10. Though features are discussed in reference to the depicted tripod, it should be understood that the features may be implemented in an equipment support having any number of legs.

The tripod 10 may include a platform 12 for detachably securing equipment to the tripod 10 using a set screw or other attachment mechanism. The tripod 10 may include a plurality of legs 14 to support the platform 12 at an elevated position. The platform 12 may be detachably mounted within an apex 18 of the tripod, which may be a ring into which the platform 12 may be secured. Each of the legs 14 may include a plurality of telescoping leg sections that nest together in a retracted position by releasing an appropriate locking mechanism 16. Although the platform 12 is shown as having a fixed vertical position with respect to the apex 18, it is understood that the platform 12 may be supported by a vertically-extensible column slidably engaged with the apex 18. The platform 12 may include a spirit level 20 (see FIG. 2).

Figure 2:
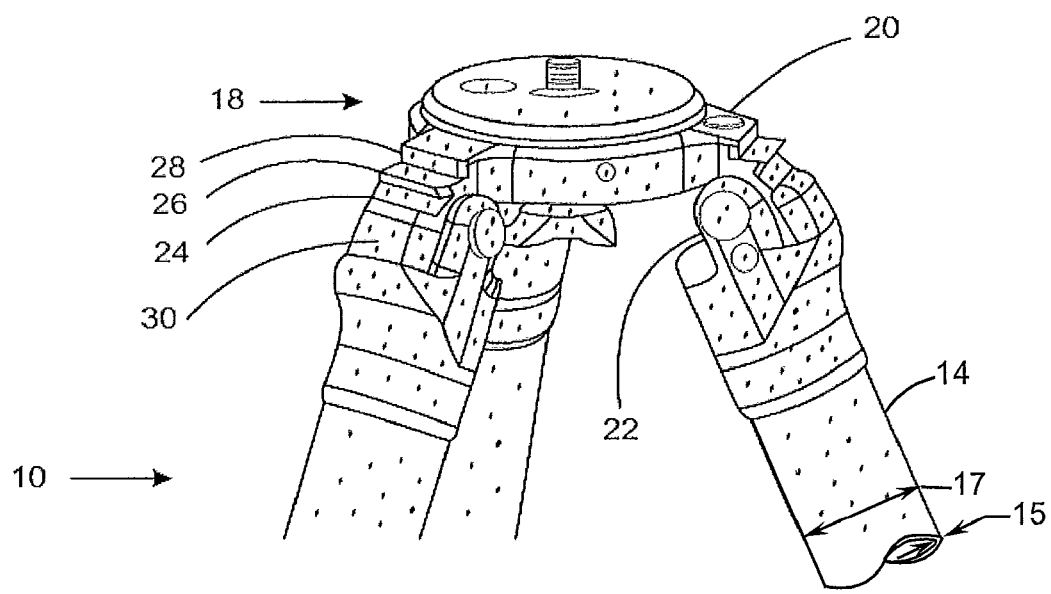
FIG. 2 shows an enlarged view if the apex of the tripod of FIG. 1.

Referring also to FIG. 2, each of the legs 14 preferably pivots about a respective axis 22 proximate the apex 18. Through a selective choice of respective angles between each of the legs 14 and the apex 18, along with a desired telescoped length of each respective leg, equipment attached to the tripod 10 may be supported on a wide variety of terrain.

As previously noted, two competing characteristics of a tripod are stability and portability. Heavier tripods typically having large legs and footprints which can be extremely stable even while fully extended and supporting heavy equipment above the apex. Unfortunately, heavy tripods tend to be bulky and burdensome to carry to different locations. A desirable tripod 10 achieves high stability, relative to its weight, and is also able to collapse to a very portable size.

Each of the legs 14 is preferably formed of carbon-fiber material selected for its light weight and high strength. The tripod legs 14 may include a plurality of hollow, nested telescoping sections, for examples, leg sections 14A, 14B, 14C and 14D, where the largest section of each leg, into which the other leg sections selectively retract, is preferably less than approximately 3/32 inches thick 15 along a major portion of its length, more preferably less than approximately 0.08 inches thick along a major portion of its length, and even more preferably less than approximately 0.04 inches thick along a major portion of its length. The term "approximately" in this context means within a range of plus and/or minus 10%.

Although conventional wisdom would suggest that such a thin wall thickness 15 would detract from the strength of the respective legs, and hence hamper the ability of the tripod 10 to support large weights in a stable manner, the tripod 10 overcomes such a limitation by having legs of a relatively large diameter 17. For example, the largest section of the legs 14, into which the other leg sections selectively retract, may preferably be approximately 1.5 inches or greater along a major portion of its length.

Figure 3A:
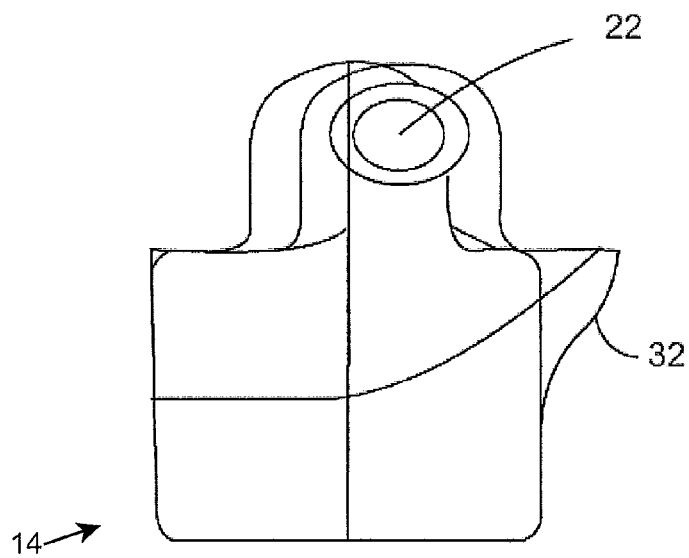
FIG. 3A shows a view of the upper portion of an exemplary leg attached to the apex of the tripod of FIG. 1.
Figure 3B:
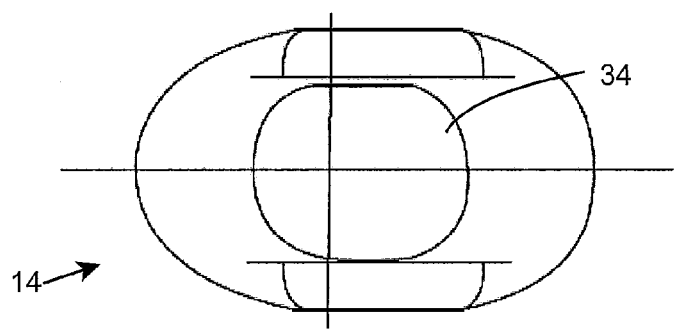
FIG. 3B shows a top view of the upper portion of the leg of FIG. 3A, removed from the apex of the tripod of FIG. 1.
Figure 3C:
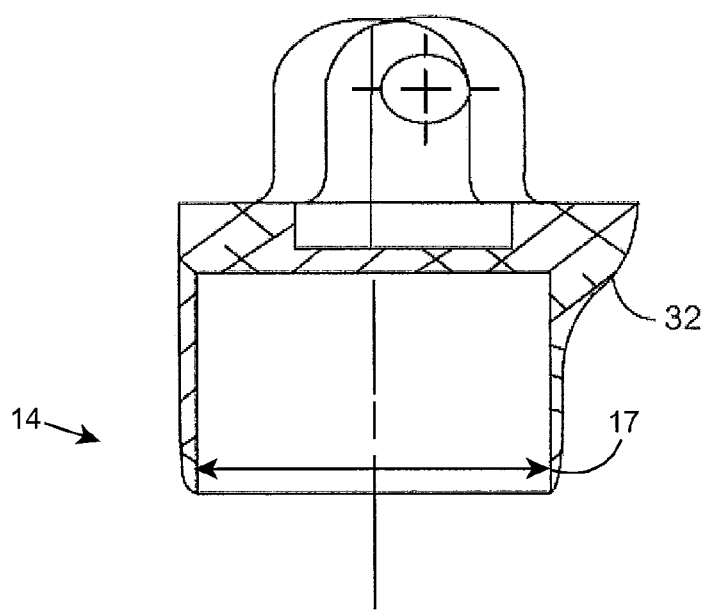
FIG. 3C shows a vertical section of upper portion of the leg of FIG. 3A.

Referring to FIGS. 3A-3C, the tripod 10 preferably includes legs 14 that pivot about the axis 22 off-center from a longitudinal centerline of the respective legs 14. This off-center pivot axis serves two principal functions. First, the off-center pivot axis 22 for the respective legs allows the legs to pivot inwardly to occupy a smaller circumference when collapsed and carried, than the tripod 10 would occupy with a pivot axis 22 centered with the respective leg. Furthermore, the off-center pivot axis enhances the stability of the tripod 10 when extended and used. Preferably the pivot axis 22 is offset from the centerline of a respectively associated leg 14 by approximately one tenth the diameter of the leg 14 or more. More preferably the pivot axis 22 is offset from the centerline of a respectively associated leg 14 by approximately one eighth the diameter of the leg 14 or more. Even more preferably, the pivot axis 22 is offset from the centerline of a respectively associated leg 14 by approximately one sixth the diameter of the leg 14 or more.

This off-center pivot is further explained in referring to FIGS. 2 and 3C. The tripod 10 preferably includes graduated ratcheting surfaces 24, 26, and 28, along with a retractable angle stop 30. In operation, the pivot angle of the legs may be adjusted so that the angle stop 30 rests against a desired one of the ratcheting surfaces 24, 26, or 28, which then prevent the weight of the attached equipment from further pivoting the legs. The angle stop 30 transfers loading forces from the apex 18 to the legs 14. If the angle stop 30 of the tripod, particularly when positioned on the upper ratcheting surface 28, is not aligned with the wall of the leg to which it is associated, then the transmitted load by the equipment creates large bending moments on the legs 14. With an off-center pivot axis 22, the tripod 10 aligns the loading forces with the walls of the legs 14 throughout the range of movement of each leg as it pivots about the axis 22. To further align the loading forces with the legs, each of the legs 14 of the tripod 10 may have, at the end proximate the angle stop, an outwardly-bulging support surface 32 to fully support the angle stop 30.

Figure 4A:
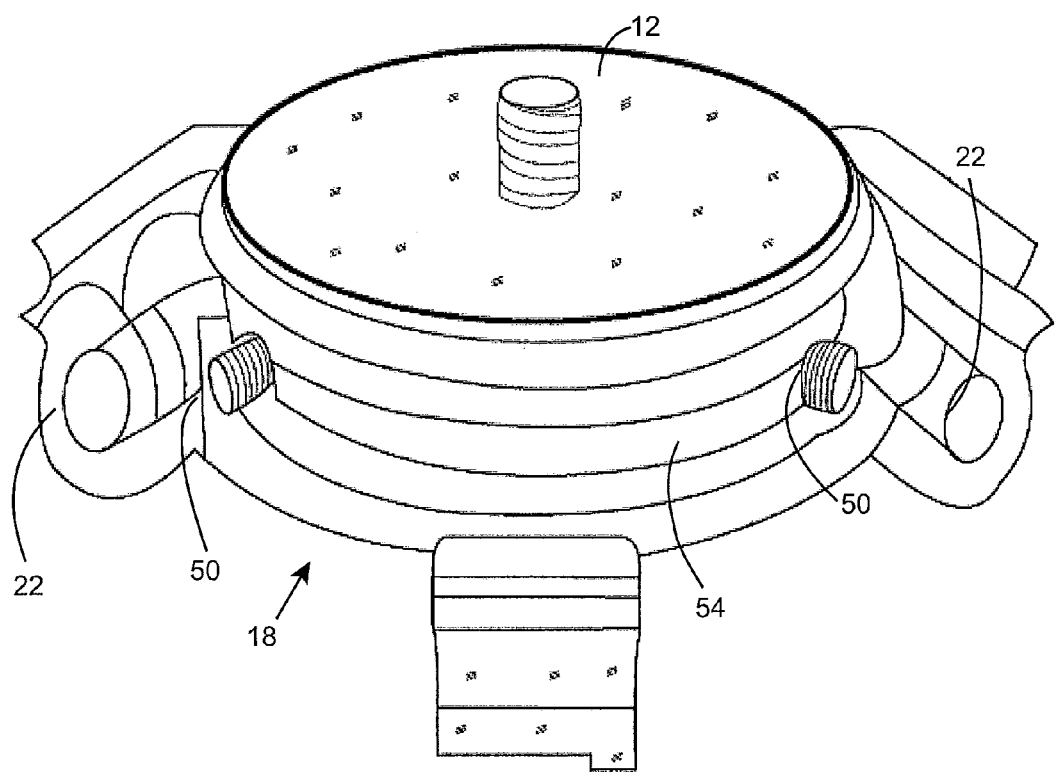
FIG. 4A shows an attachment mechanism for securing a platform to the apex of the tripod of FIG. 1.
Figure 4B:
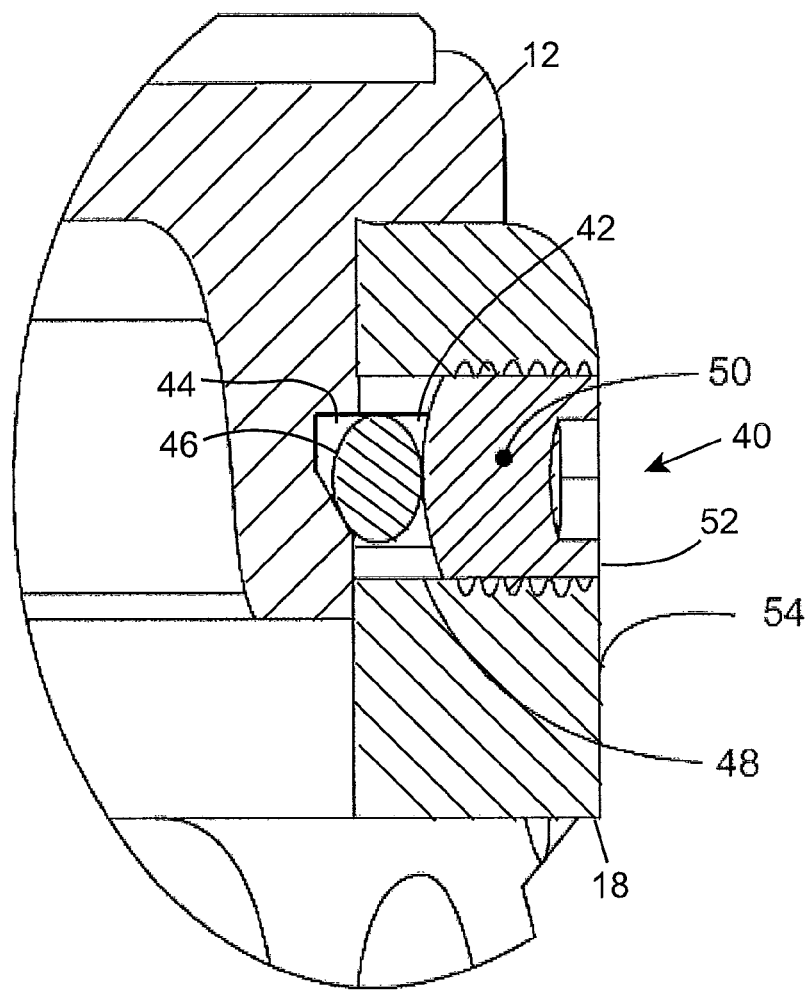
FIG. 4B shows a sectional view of the attachment mechanism shown in FIG. 4A.
Figure 5A:
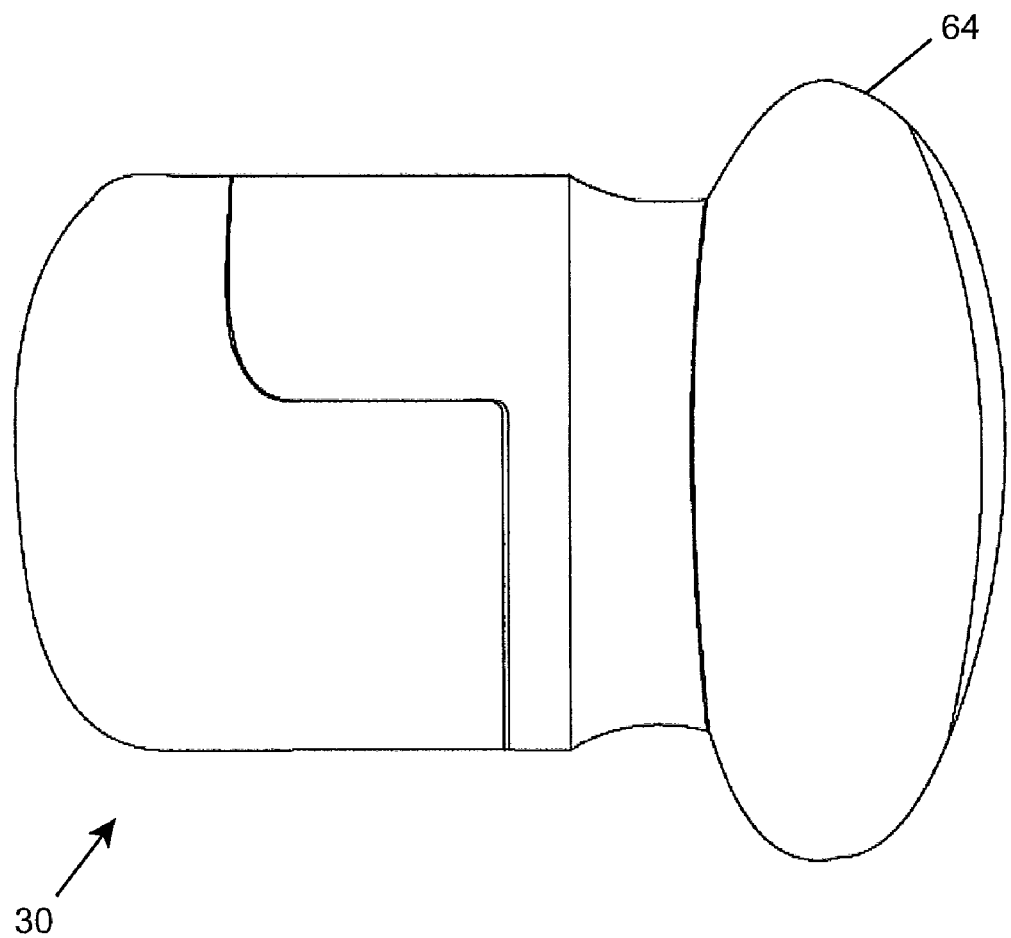
FIG. 5A shows an enlarged top view of an angle stop for the tripod of FIG. 1.
Figure 5B:
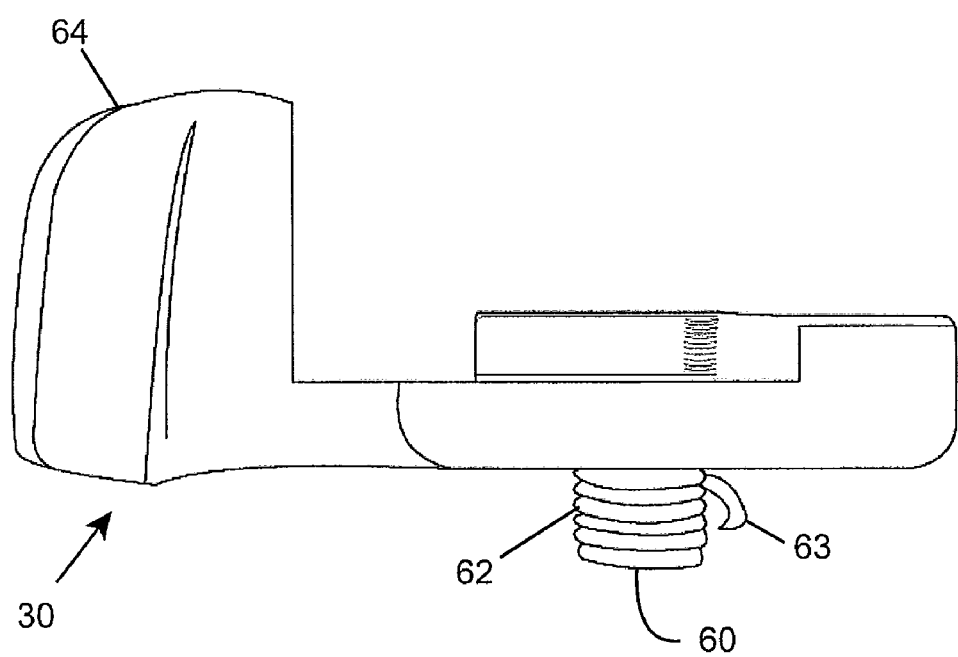
FIG. 5B shows an enlarged side view of an angle stop for the tripod of FIG. 1.

Tripods are often carried from one location to another with the equipment, e.g. a camera, still attached. In this situation, it is sometimes the base of the platform 12, and hence the equipment, that is not securely attached to apex 18 causing the equipment to detach and fall to the ground. This can be disastrous if the equipment is expensive. To reduce the likelihood of such a disastrous event, the tripod 10 may include a visual warning system 40, illustrated in FIGS. 4A and 4B, that indicates to a user when the platform 12 is not securely fastened to the apex 18. Both the apex 18 and the platform 12 may include respective channels 42 and 44 that align with each other when the platform 12 rests in the apex 18. A ring-shaped spring 46 is pre-compressed into the channel 42 of the apex 18, preferably extending over a major portion of the circumference of the apex 18, e.g. approximately 270 degrees or greater. One or more threaded slots 48 are formed in the apex 18, perpendicular to and intersecting the groove 42, so that respective warning members 50 may be inserted into the respective threaded slots 48.

When it is desired to secure the platform 12 to the apex 18, each of the warning members 50 may be rotated in their respective slots in a direction that pushes the spring 46 inward to engage with the groove 44 of the platform 12, preventing its separation from the apex 18. When it is desired to release the platform 12 from the apex 18, each of the warning members 50 may be rotated in their respective slots in an opposite direction to allow the spring 46 to move outward to disengage from the groove 44 of the platform 12, allowing its separation from the apex 18. Preferably, the warning members 50 include an outer surface 52 that is flush with the surface 54 of the apex 18 when the platform 12 is fully locked into the apex 18. In this manner, a user can be quickly visually warned when the platform is not securely engaged because the warning members 50 will be extended radially-outward from the outer surface 54 of the apex 18.

Preferably, the tripod 10 includes several warning members 50 spaced apart around the circumference of the apex 18 so that a user may be warned that a platform is not securely attached when the tripod when viewed from multiple angles. For example, the tripod 10 may include three warning members 50 spaced around the circumference of the tripod 10.

Figure 6A:
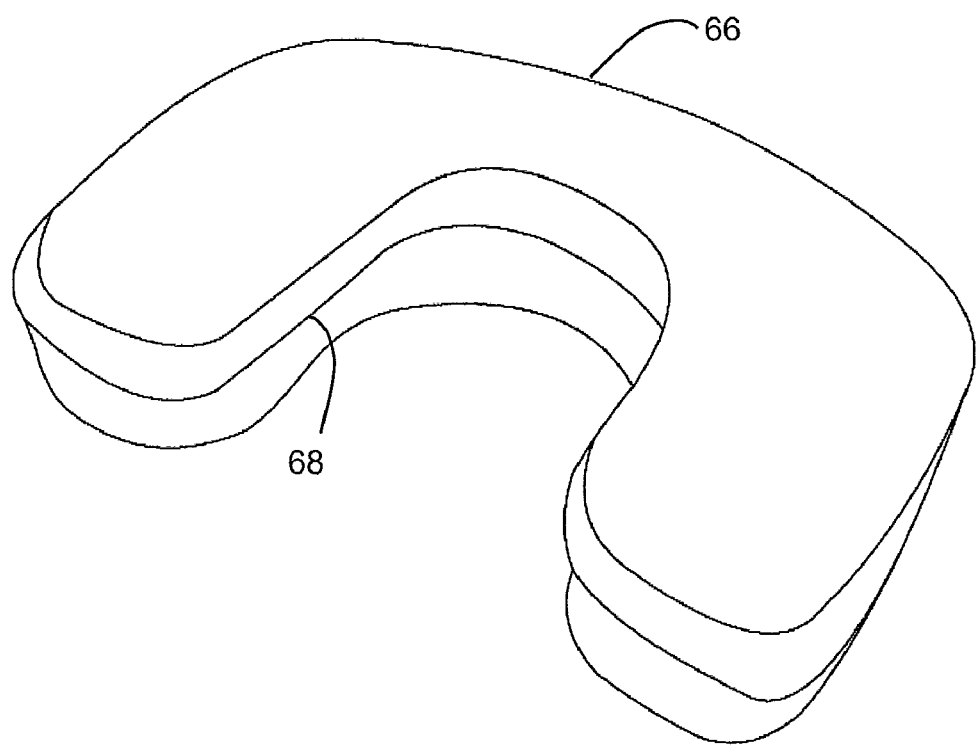
FIG. 6A shows an insert resting in the pocket shown in FIG. 3B.
Figure 6B:
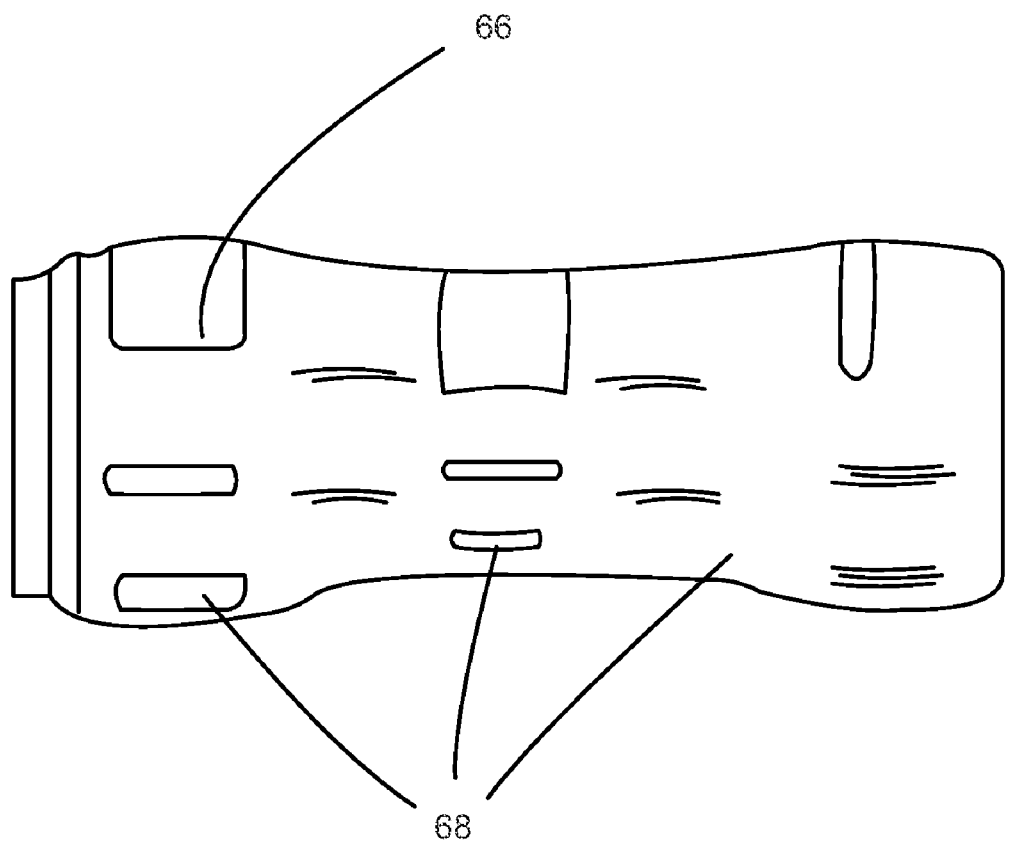
FIG. 6B shows a sectional view of the insert shown in FIG. 6A.
Figure 6C:
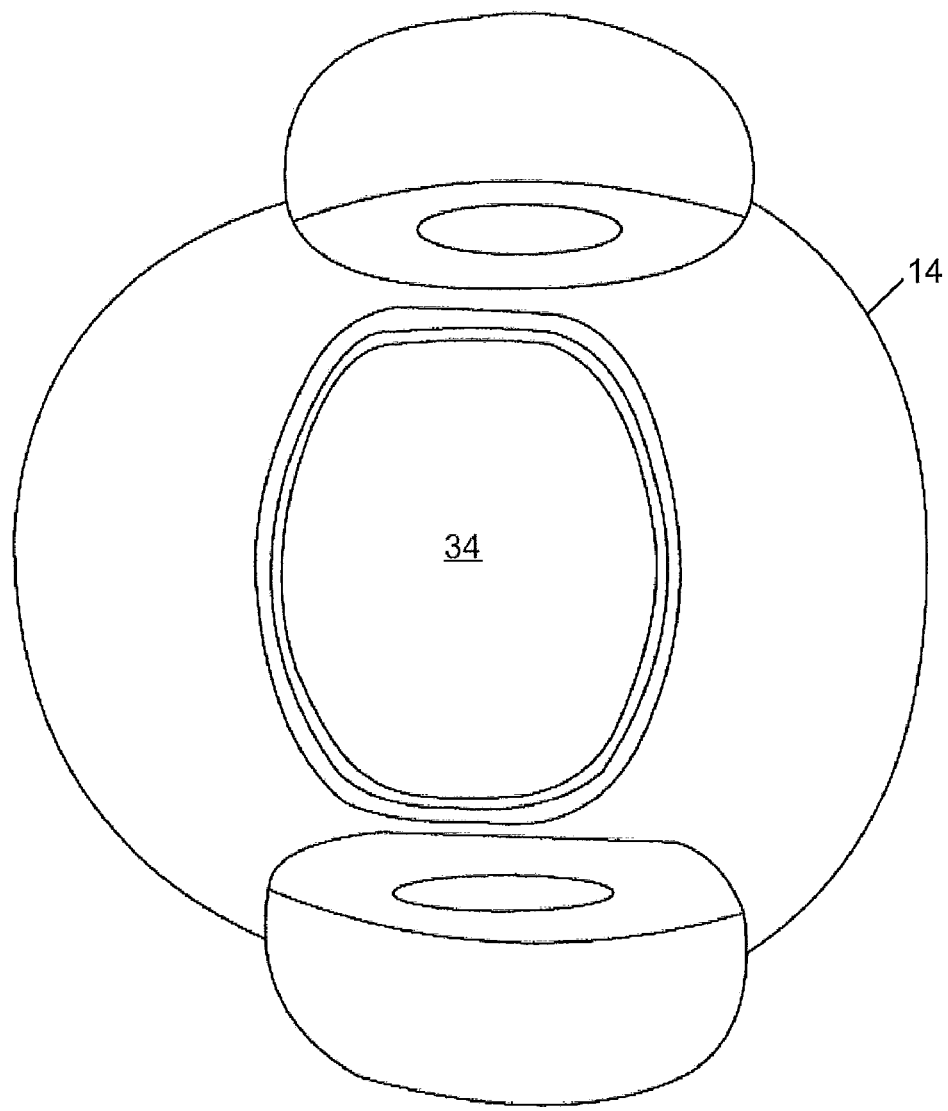
FIG. 6C shows a top view of a detached leg of the tripod of FIG. 1, with an assembled insert resting in the pocket of the leg.

Referring to FIGS. 2, 5A, 5B, 6A, and 6B, the tripod 10 may include a ratcheting mechanism for quickly locking the leg 14 into a desired position. As noted previously, an angle stop 30 prevents legs from pivoting under the weight of a load whenever the angle stop 30 bears against any of the ratcheting surfaces 24, 26, and 28, as shown in FIG. 2. The legs 14 of the tripod 10 can be quickly snapped against a desired one of the surfaces 24, 26, and 28. The angle stop 30 preferably includes a pin 60 around which is positioned an engagement spring 62. The engagement spring 62 may slidably engage with a curved channel 68 of an insert member 66 positioned in a pocket 34 of a respective leg 14, as shown in FIG. 6C. The curved channel 68 is shaped, and the insert member 66 is sized within the pocket 34, so that the spring 62 is never fully uncompressed, i.e. cannot through its own spring action be fully removed from the channel 68 while the insert 66 is fitted in the pocket 34 of an assembled tripod 10.

In operation, a user pulls outwardly on a tab 64 of the angle stop 30 so as to disengage the angle stop 30, for example, from a respective ratcheting surface. When pulling the tab 64, the spring 62 will move inwardly into the channel to a fully compressed position where the lateral spring force on the channel 68 such that the spring 62 will not move according to its own spring force in a direction out of the channel 68. As the leg 14 is pivoted upwards to a position proximate the highest ratcheting surface 28, however, gravity will slide the angle stop 30 a sufficient distance that the lateral wings 63 of the spring move along the curved surface of the channel 68 to apply a force against the channel that cause the pin 60, and hence the angle stop 30, to snap against the upper ratcheting surface 28. As the leg is manually rotated downwards, this spring force will cause the angle stop 30 to successively snap into position against each successively lower ratcheting surface 26 and 24. In this manner, the described ratcheting mechanism may be used to very quickly lock a leg into any one of a desired number of pre-set angular positions.

Figure 14:
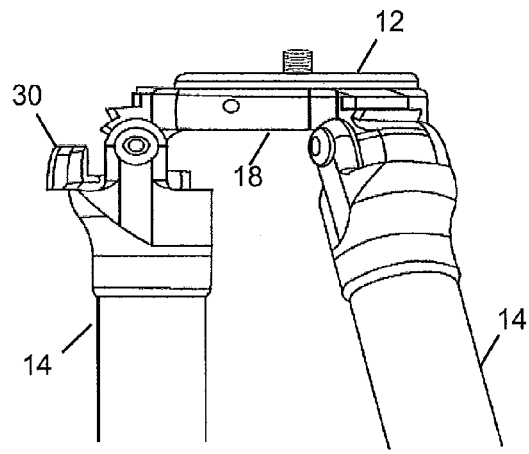
FIG. 14 illustrates an exemplary ratcheting mechanism.
Figure 15:
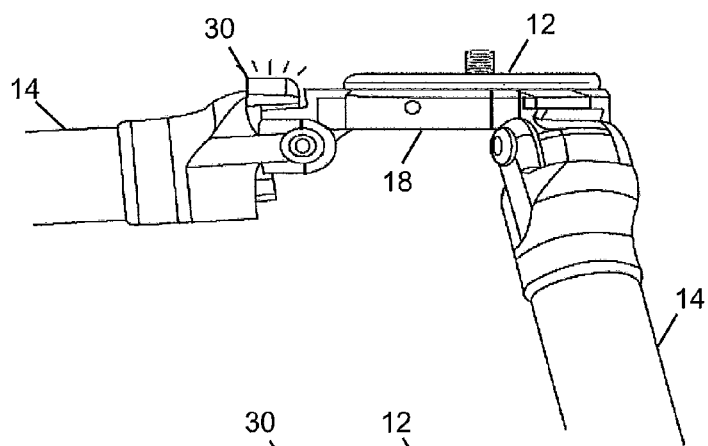
FIG. 15 is a second illustration of the exemplary ratcheting mechanism of FIG. 14.
Figure 16:
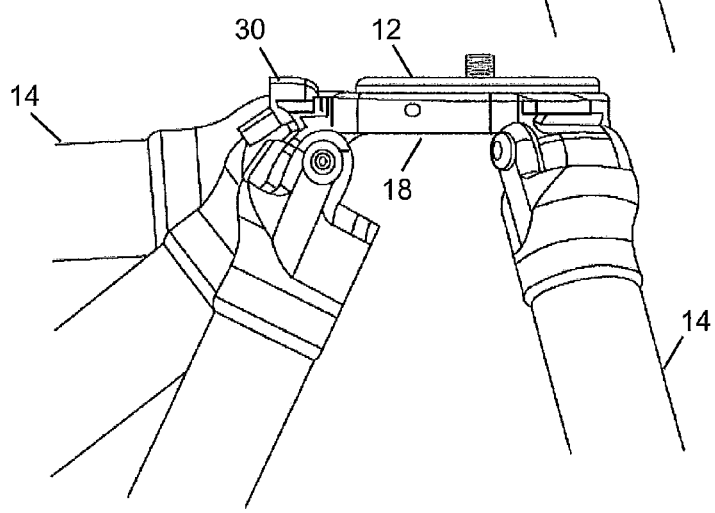
FIG. 16 is a third illustration of the exemplary ratcheting mechanism of FIG. 14.

Referring to FIGS. 14, 15, and 16, an exemplary operation of the ratcheting mechanism is shown. The leg 14 is preferably swung inwardly slightly and the angle stop 30 is disengaged by sliding it outwardly. Then the leg is swung to a more horizontal position at which the angle stop will preferably automatically engage. Then the leg is lowered while the angle stop will ratchet down automatically.

Figure 7A:
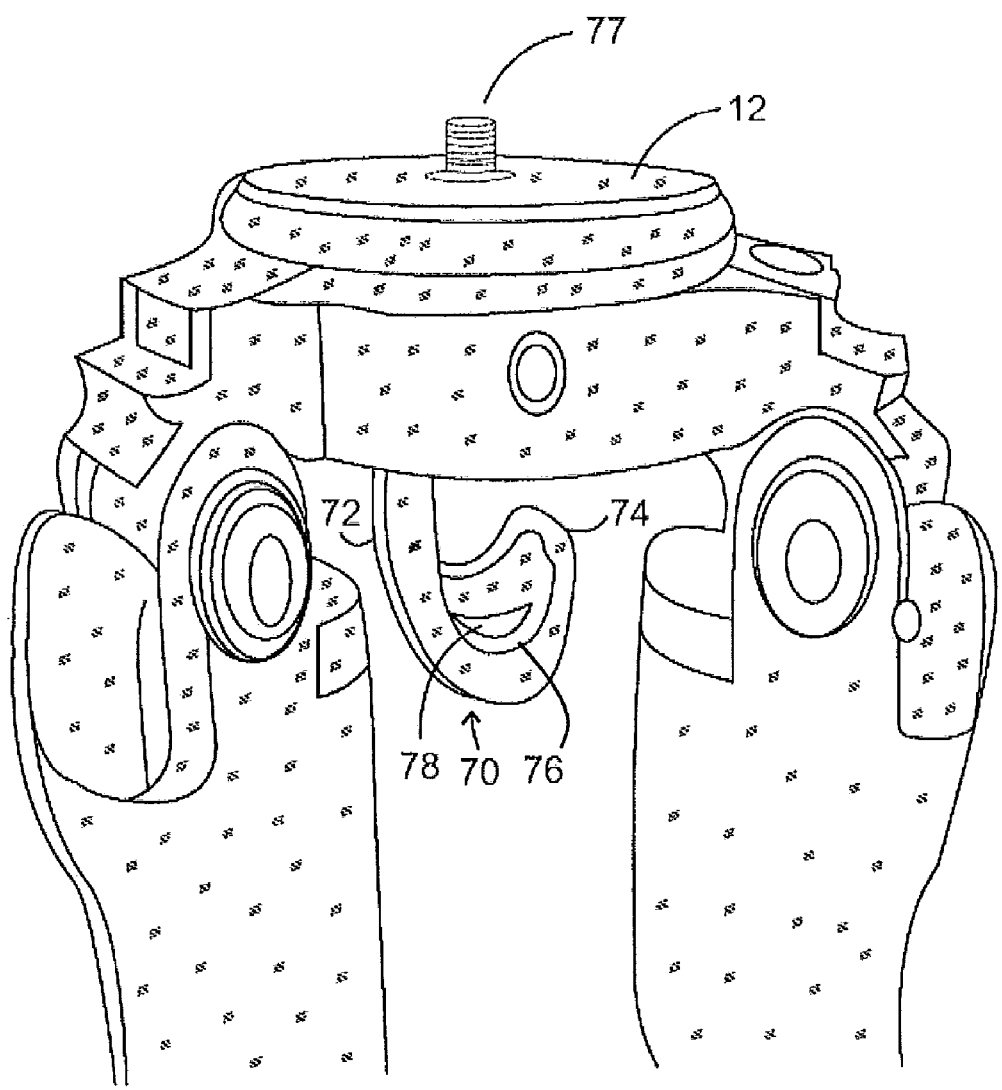
FIG. 7A shows a perspective view of a platform supported by the apex of the tripod of FIG. 1.
Figure 7B:
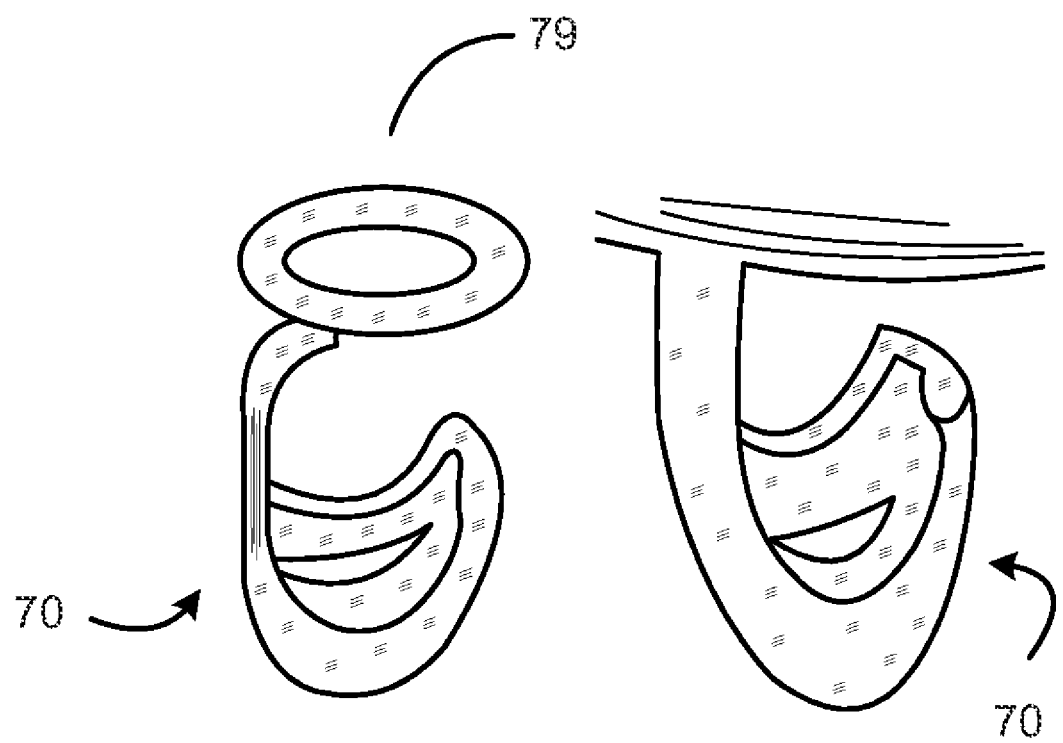
FIG. 7B shows a swivel hook mounted to the platform of FIG. 7A.

Referring to FIGS. 7A and 7B, the tripod 10 may include a platform 12 having a fastener 70 attached to the bottom surface of the platform 12. The fastener 70 is preferably shaped, in profile, as a hook with a leg portion 72 and an upwardly-directed tail portion 74, thereby forming a generally concave surface 76 into which, for example, a strap supporting a camera back may be suspended from the fastener to provide additional weight on the tripod 10 for further stabilization. The term concave, in reference to the fastener 70 does not require a smoothly-curved surface 76, as the hook shape of the fastener 70 may be achieved by square or other angles, as well. The surface 76 preferably defines closed-loop aperture 78 by which a carabineer or similar attachment device may be securely attached to the fastener 70. The fastener 70 preferably swivels about a vertical axis so that the fastener 70 may be easily oriented to a position that most conveniently allows a weighted object to be slung from the tripod 10. In this vein, the fastener 70 preferably includes an opening 79 through which a fastening screw 77, used to secure equipment to the platform 12, also secures the fastener 70 to the lower surface of the platform 12.

Figure 8:
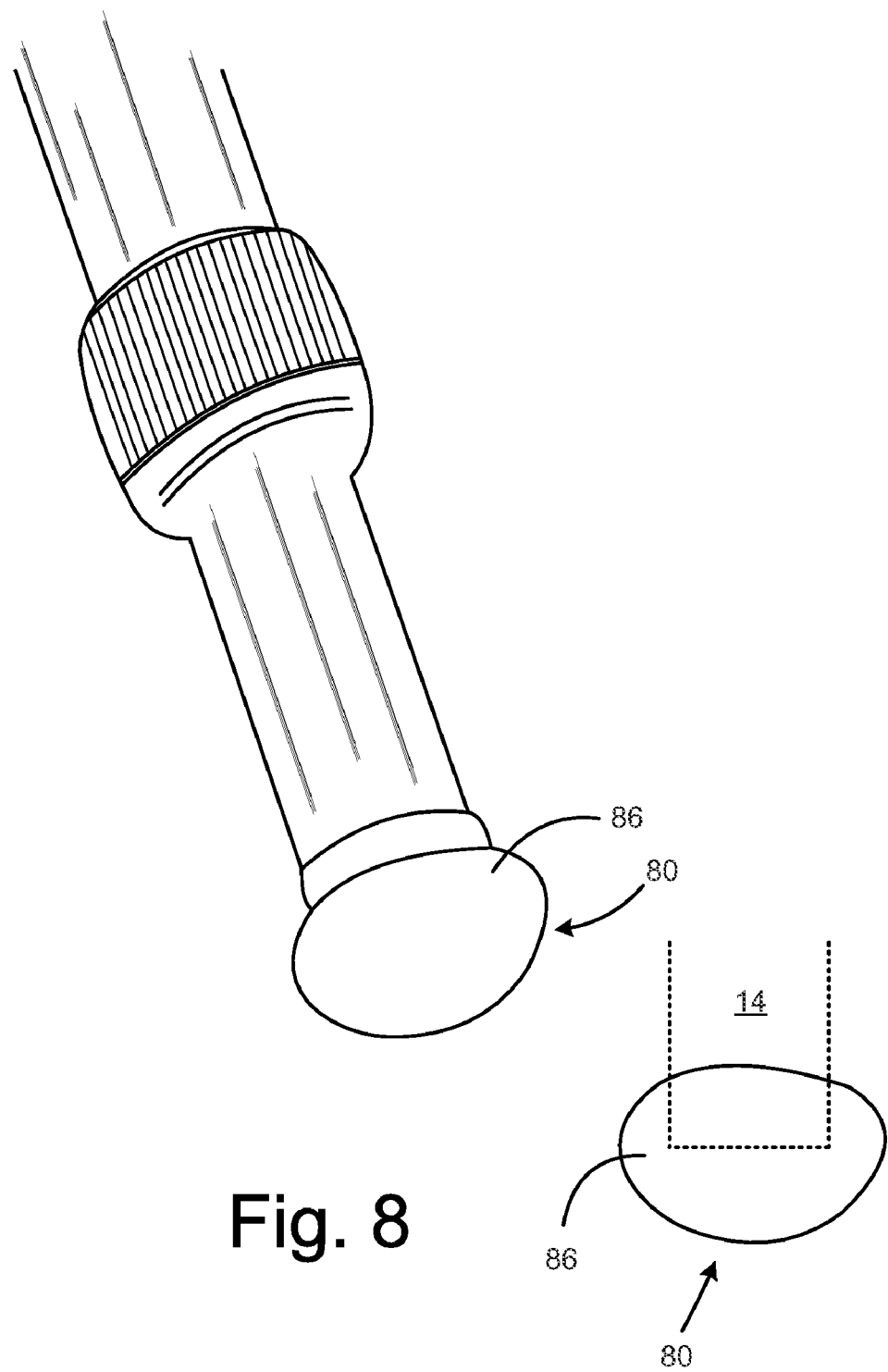
FIG. 8 shows an exemplary foot for the legs of the tripod of FIG. 1.

Referring to FIG. 8, each of the legs 14 of the tripod 10 may include a foot 80 having a shape that includes an upper portion secured to a respective leg and a lower portion defining a convex surface 86 that extends radially beyond the diameter of the respective leg 14 to which the foot 80 is attached. This mushroom shape ensures that the convex surface 86 is tangent to a supporting surface, such as the ground, over the full arc through which the leg pivots. This serves two functions. First, it ensures that the walls of the leg 14 do not contact the ground, enhancing the durability of the tripod 10. Also, the contact between the foot 80, which may be rubber for example, and the supporting surface inhibits slippage of the leg 14 regardless of the angle of the leg 14 relative to the apex 18.

Figure 9:
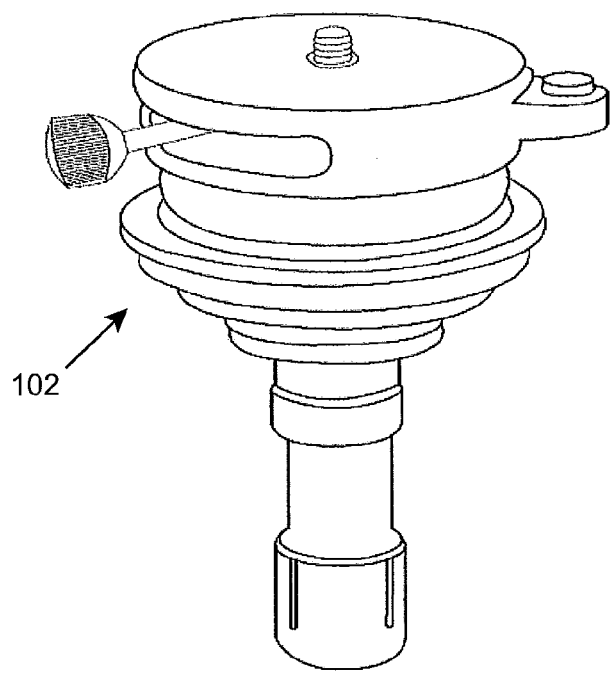
FIG. 9 illustrates a leveling panning base.

Referring to FIG. 9, a leveling panning base 102 may be engaged with the apex of the tripod in a manner similar to the manner of engagement of the platform.

Figure 10A:
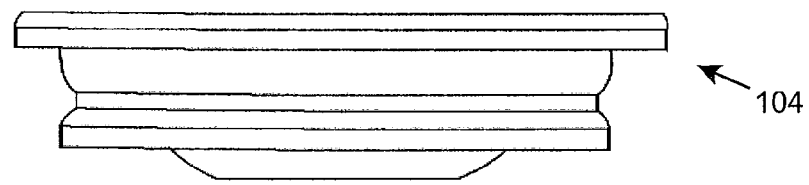
FIG. 10A illustrates a plan view of a video bowl.
Figure 10B:
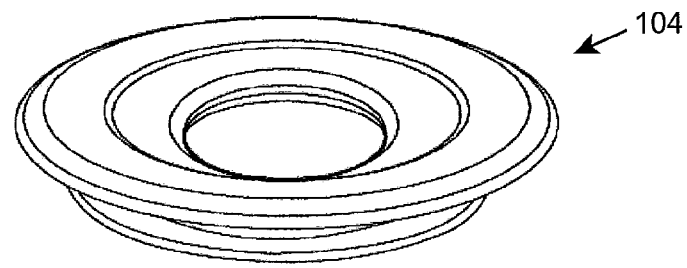
FIG. 10B illustrates a perspective view of the video bowl of FIG. 10A.

Referring to FIGS. 10A and 10B, a video bowl 104 may be engaged within the apex of the tripod, in a manner similar to that of the platform. In this manner, a ball base of a standard video camera may detachably engage with the video bowl.

Figures 11A, 11B:
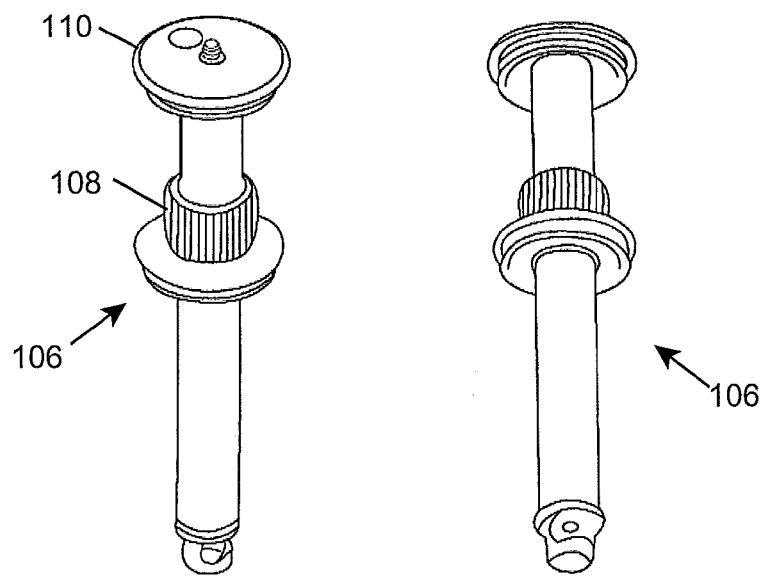
FIG. 11A illustrates a first prospective view of a quick column.
FIG. 11B illustrates a second prospective view of the quick column of FIG. 11A.

Referring to FIGS. 11A and 11B, a quick column 106 may be engaged within the apex of the tripod, in a manner similar to that of the platform. By loosening and tightening the knurled stem 108, the head 110 of the quick column 106 may be raised and lowered, and selectively secured in position. This provides a platform for equipment of variable height in a manner generally independent of the height of the tripod.

Figure 12:
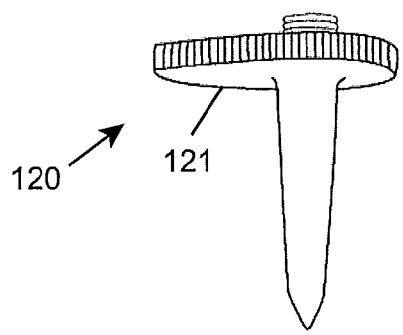
FIG. 12 illustrates a stomping spike.

Referring to FIG. 12, stomping spikes 120 may be engaged at the end of the legs, thereby replacing the typical feet. The spikes include a teardrop shaped pedal 121 to allow for them to be readily driven into the ground with the user's foot. This permits stabilization of the tripod in heavy crosswinds and on shifty terrain.

Figure 13:
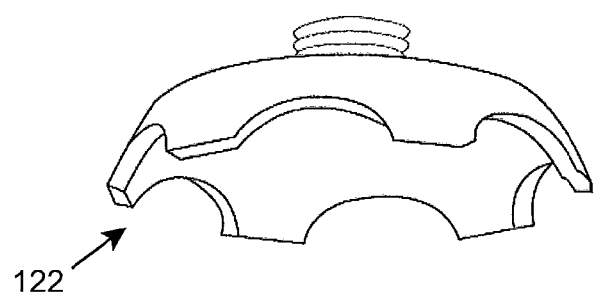
FIG. 13 illustrates a rock claw.

Referring to FIG. 13, rock claws 122 may be engaged at the ends of the legs, thereby replacing the typical feet. The rock claws include a cup shape to allow them to be readily engaged with rocks and other hard surfaces. This permits stabilization of the tripod on hard and wet terrain.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

We claim:

1. A support having a plurality of elongate hollow leg members, each at least partially supporting an apex selectively, detachably mountable to equipment and defining a supporting surface for said equipment, at least one leg member selectively pivoting about a pivot axis parallel to said supporting surface and at an off-center position in relation to a circumference of said at least one leg member.

2. The support of claim 1 where said at least one leg member is operatively engaged with a selectively releasable angle stop that, together with said apex, defines a plurality of fixed angular positions around said pivot axis at which angular rotation of said at least one leg member around said pivot axis is inhibited.

3. The support of claim 2 where said angle stop has a lower surface that bears against said at least one leg member, and where said at least one leg member includes an off-center support surface that bears against said angle stop along a major portion of said lower surface in each of said plurality of fixed angular positions.

4. The support of claim 3 where said off-center support surface bears against said angle stop along all of said lower surface in each of said plurality of fixed angular positions.

5. The support of claim 2 where said apex defines a supporting surface for said equipment, and where said angle stop automatically ratchets into a next sequential one of said fixed angular positions as said at least one leg member is pivoted towards a perpendicular position with respect to said supporting surface.

6. A support having an apex selectively, detachably mountable to a platform for securing equipment to said platform, said apex comprising:
   (a) an attachment member selectively attachable to a said platform; and
   (b) at least one warning member having a first state that indicates that said platform is securely engaged with said apex and a second state that indicates that said platform is not securely engaged with said apex.

7. The support of claim 6 where said at least one warning member is viewable from any angle around said tripod.

8. The support of claim 6 where said apex forms a perimeter surface into which said platform is selectively insertable.

9. The support of claim 8 including a spring member compressed into a recessed position within said perimeter surface.

10. The support of claim 9 including at least one locking member that selectively causes said spring member to engage with a said platform mounted in said apex.

11. The support of claim 10 where said locking member is a said at least one warning member.

12. The support of claim 11 where said locking member has a visible warning surface flush with an exterior surface of said apex when said spring member is engaged with said platform.

13. The support of claim 9 where said spring member extends around a major portion of said perimeter surface.

14. The support of claim 13 including plural locking members that selectively cause said spring member to engage with a said platform mounted in said apex at locations approximately equidistant from each other.

15. The support of claim 6 where said platform is attachable to said attachment member at a selective height relative to said apex.

16. A support comprising:
(a) at least one elongate leg element at least partially supporting an apex selectively, detachably mountable to equipment;
(b) a selectively releasable angle stop that, together with said apex, defines a plurality of fixed angular positions around a pivot axis at which angular rotation of said at least one leg element around said pivot axis in a first direction is selectively, automatically inhibited; where
(c) said angle stop has a first position that permits manual rotation of said leg element in said first direction without said angle stop engaging with said apex in at least one of said fixed angular positions, and a second position where manual rotation of said leg element in a second direction causes said angle stop to automatically engage into a next sequential one of said fixed angular positions.

17. The support of claim 16 where said apex has a support surface for supporting said equipment, and said first position causes said angle stop to engage in only the one of said fixed angular positions closest to said support surface.

18. A support comprising:
(a) an apex supported by at least one elongate leg capable of pivoting about a pivot axis parallel to a support surface of said apex; where
(b) said pivot axis is offset from a centerline of a cross section of said elongate leg, said centerline parallel to said pivot axis.

19. The support of claim 18 where said offset measures at least one-tenth the minimum diameter of said elongate leg.

20. The support of claim 18 where said offset measures at least one-eighth the minimum diameter of said elongate leg.

21. The support of claim 18 where said offset measures approximately one-sixth the minimum diameter of said elongate leg.

22. A support for supporting equipment, said comprising:
(a) at least one elongate leg element at least partially supporting an apex selectively, detachably mountable to equipment, where said leg includes a first end proximate said apex and a second end distal said apex, and where said leg is pivotal about an axis proximate said first end throughout a limited arc; and
(b) a foot at said second end having a curved surface that, while said support supports equipment above a supporting surface, is tangent to said supporting surface throughout said arc.

23. The support of claim 22 where said curved surface is convex and extends radially beyond an outer diameter of said leg proximate said foot.

24. The support of claim 22 where said foot has a mushroom shape.

25. A platform selectively, detachably mountable to an apex of a support having a plurality of legs extending from said apex, said platform including an open-ended hook integrally forming a closed-loop aperture, said hook rotatable about a substantially vertical axis.

26. The platform of claim 25 where said hook is capable of selectively, detachably supporting a weight from a closed-loop strap.

27. The platform of claim 26 where said hook is capable of securely interlocking with a carabineer.

28. The platform of claim 26 where said aperture is generally perpendicular to said hook.

* * * * *

UNITED STATES PATENT AND TRADEMARK OFFICE
CERTIFICATE OF CORRECTION

PATENT NO.       : 8,398,037 B2                         Page 1 of 1
APPLICATION NO.  : 13/032149
DATED            : March 19, 2013
INVENTOR(S)      : Joseph M. Johnson et al.

It is certified that error appears in the above-identified patent and that said Letters Patent is hereby corrected as shown below:

In the Claims

<u>Col. 6, Line 63</u> - Change "tripod" to read --apex--.

Signed and Sealed this
First Day of December, 2015

Michelle K. Lee
*Director of the United States Patent and Trademark Office*